US009241174B1

(12) United States Patent
Rogers

(10) Patent No.: US 9,241,174 B1
(45) Date of Patent: Jan. 19, 2016

(54) DEMAND-BASED EDGE CACHING VIDEO CONTENT SYSTEM AND METHODS

(71) Applicant: Concurrent Computers Corporation, Duluth, GA (US)

(72) Inventor: Thomas J. Rogers, Perkasie, PA (US)

(73) Assignee: Concurrent Computer Corporation, Duluth, GA (US)

( * ) Notice: Subject to any disclaimer, the term of this patent is extended or adjusted under 35 U.S.C. 154(b) by 0 days.

(21) Appl. No.: 14/546,632

(22) Filed: Nov. 18, 2014

(51) Int. Cl.
*H04N 21/20* (2011.01)
*H04N 21/231* (2011.01)
*H04N 21/2225* (2011.01)
*H04N 21/218* (2011.01)
*H04N 21/21* (2011.01)
*H04N 21/222* (2011.01)

(52) U.S. Cl.
CPC ......... *H04N 21/23103* (2013.01); *H04N 21/20* (2013.01); *H04N 21/21* (2013.01); *H04N 21/2181* (2013.01); *H04N 21/222* (2013.01); *H04N 21/2225* (2013.01); *H04N 21/231* (2013.01); *H04N 2021/225* (2013.01)

(58) Field of Classification Search
CPC ..... H04N 21/20; H04N 21/21; H04N 21/222; H04N 21/2225; H04N 21/2181
See application file for complete search history.

(56) References Cited

U.S. PATENT DOCUMENTS

| 5,517,588 | A | 5/1996 | Kondo |
| 7,006,881 | B1 | 2/2006 | Hoffberg et al. |
| 7,213,021 | B2 | 5/2007 | Taguchi et al. |
| 7,676,835 | B2 | 3/2010 | Brannon et al. |
| 8,099,508 | B2 | 1/2012 | Mao et al. |
| 8,166,170 | B2 | 4/2012 | Segev et al. |
| 8,181,210 | B2 | 5/2012 | Amir et al. |
| 8,291,117 | B1 * | 10/2012 | Eggleston ........... H04L 61/2007 709/245 |
| 8,422,397 | B2 | 4/2013 | Ansari et al. |
| 8,474,002 | B2 | 6/2013 | Johnson |

(Continued)

FOREIGN PATENT DOCUMENTS

| CA | 2762456 | 6/2012 |
| WO | WO-2014/000558 | 6/2013 |

OTHER PUBLICATIONS

"White Paper", *CAMA: A Predictable Cache-Aware Memory Allocator*; Authored Herter, Peter Backes, Florian Haupenthal, and Jan Reineke; Unknown Published date but prior to filed of present application.

(Continued)

*Primary Examiner* — Robert Hance
(74) *Attorney, Agent, or Firm* — Philip H. Burrus, IV

(57) ABSTRACT

A video-on-demand system includes a resource manager (501) in communication with a central storage server (502), a back office system (503), and a plurality of edge servers (504). The resource manager can receive (523) a video-on-demand session request 524) requesting delivery of content (529), read (525) a content allocation register (520) that includes a popular asset list (301) with a plurality of content assets ranked (314) by highest demand (314) within a predetermined past usage window (316) and an edge server list (302) indicating which edge servers have delivered each content asset of the popular asset list. The resource manger can then Select (526) a selected edge server (527) from the content allocation register as a function of the popular asset list and the edge server list and cause (528) the selected edge server to deliver (529) the content in response to the video-on-demand session request.

20 Claims, 6 Drawing Sheets

(56) References Cited

U.S. PATENT DOCUMENTS

| | | | |
|---|---|---|---|
| 8,505,057 B2 | 8/2013 | Rogers | |
| 8,516,529 B2 | 8/2013 | Lajoie et al. | |
| 8,621,543 B2 | 12/2013 | Segev et al. | |
| 8,707,288 B2 | 4/2014 | Roseborough | |
| 2002/0007392 A1* | 1/2002 | Buddhikot | H04N 7/165 709/203 |
| 2005/0193414 A1 | 9/2005 | Horvitz et al. | |
| 2006/0015574 A1* | 1/2006 | Seed | H04L 67/1095 709/219 |
| 2008/0228920 A1* | 9/2008 | Souders | H04L 67/2842 709/226 |
| 2009/0254661 A1* | 10/2009 | Fullagar | H04L 67/2814 709/226 |
| 2010/0299552 A1 | 11/2010 | Schlack et al. | |
| 2011/0321113 A1 | 12/2011 | Bahnck et al. | |
| 2013/0021933 A1 | 1/2013 | Kovvali et al. | |
| 2013/0080611 A1* | 3/2013 | Li | H04N 21/222 709/223 |
| 2013/0144979 A1 | 6/2013 | Kansal et al. | |
| 2013/0167181 A1 | 6/2013 | Dixit et al. | |
| 2013/0243075 A1 | 9/2013 | Dalela et al. | |

OTHER PUBLICATIONS

"Information Directorate", *Video on Demand technologies and Demonstrations*; Authored by Marek Prodgorny and Geoffrey C Fox; Published May 1998.

* cited by examiner

FIG. 3

| TITLE | DEMAND (views/window) | EDGE SERVERS SERVING (WITH TIMESTAMP) |
|---|---|---|
| Mac and Buster Go to Hurtsboro | 10,000 | 192.168.10.57 (9:55 PM, 10:05 PM...), 192.168.10.60 (9:30 PM...), 192.168.10.72 (1:31 AM, 9:14 AM...), etc. |
| Door Block | 9,887 | 192.168.10.57 (8:47 PM, 11:25 PM...), 192.168.10.76 (12:01 AM...), etc. |
| Brownie the Short | 8,756 | 192.168.10.82 (7:42 PM, 8:13 PM...), 192.168.10.59 (4:48 PM...), etc. |
| Lake Adventures | 7,823 | 192.168.10.26 (5:17 PM, 10:12 PM...), 192.168.10.18 (6:22 PM...), etc. |
| Kayla's Kitchen | 6,500 | 192.168.10.76 (11:06 PM, 11:07 PM...), 192.168.10.14 (11:08 PM...), etc. |
| Cabin Sunset | 5,321 | 192.168.10.19 (3:15 AM, 4:42 AM...), 192.168.10.22 (9:33 PM...), etc. |
| A Trip to Puillac | 4,723 | 192.168.10.26 (3:55 PM, 9:57 PM...), 192.168.10.44 (8:56 PM...), etc. |
| Roll Down the Windows | 3,823 | 192.168.10.82 (9:35 PM, 11:05 PM...), 192.168.10.32 (11:00 PM...), etc. |
| Brunch Anyone? | 2,754 | 192.168.10.57 (9:56 PM, 10:25 PM...), 192.168.10.61 (8:30 PM...), etc. |
| ... | ... | ... |
| Tete du Cuvee | 1,465 | 192.168.10.57 (8:22 PM, 9:23 PM...), 192.168.10.11 (8:39 PM...), etc. |
| (Predefined Limit) | | |

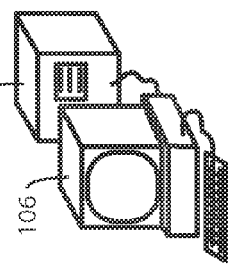

DEMAND-BASED EDGE CACHING VIDEO CONTENT SYSTEM AND METHODS

BACKGROUND

1. Technical Field

This invention relates generally to a content delivery system, and more particularly to a video-on-demand system.

2. Background Art

Video-on-demand is becoming increasingly popular. With video-on-demand, a consumer can choose not only the content they wish to see, but also the viewing time as well. When a person orders a video-on-demand session, the selected content is delivered from a server to a receiving unit at the person's location, which is frequently a set-top box.

One issue associated with video-on-demand systems involves resource allocation. Servers are distributed across a network and selecting the correct server to serve a client request can be difficult. This difficulty is compounded when the various network components are not aware of what content is stored in what servers.

It would be advantageous to have a more efficient video-on-demand system.

BRIEF DESCRIPTION OF THE DRAWINGS

FIG. 3 illustrates an explanatory resource manager and an explanatory content allocation register in accordance with one or more embodiments of the disclosure.

Figure 1:
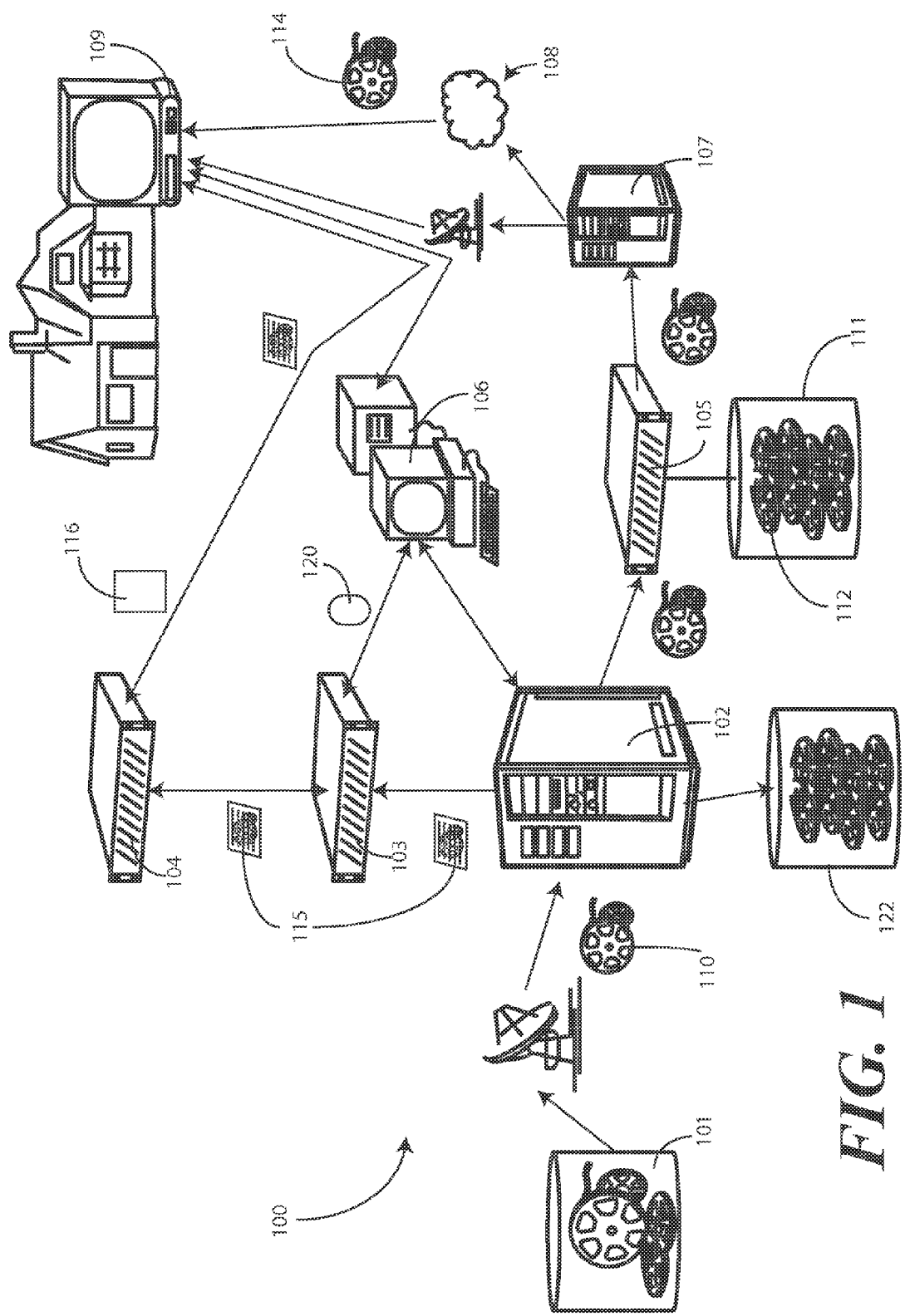
FIG. 1 illustrates an explanatory video-on-demand system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to selecting local servers to serve a client request in a video-on-demand system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the selection of edge servers as described herein. The non-processor circuits may include, but are not limited to, network communication devices, routers, switches, video compression and decompression engines, and user video-on-demand devices. As such, these functions may be interpreted as steps of a method to perform edge server selection as described herein. It is expected that one of ordinary skill, notwithstanding possibly significant effort and many design choices motivated by, for example, available time, current technology, and economic considerations, when guided by the concepts and principles disclosed herein will be readily capable of generating such systems and methods with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that, with the advent of Internet based content delivery networks, such as video-on-demand systems, operators of such systems are deploying video streaming equipment at the edges of their networks. The "edge" is a system location closer to an end customer and farther from a central server complex. These edge-based video streaming servers perform caching of content offerings, such as video, audio, and multimedia content. However, in most systems, there is no central entity that is aware of the caching that is occurring at each edge server.

When a viewer requests a particular content offering, the initial request is typically delivered to a central entity known as a "back office" of the system. In prior art systems, the back office is unaware of the caching of various content offerings on video servers disposed at the edge of the system. Said differently, the central server complex of many systems is unaware of what content offerings are stored on which edge server.

This lack of knowledge stems from the fact that edge servers are continuously serving client requests, fetching content from the central server complex or intermediate servers, and overwriting previous content files. Without such knowledge, the back office is left to select—at random—a particular edge server for streaming the content offering. In some situations, the edge server is selected solely as a function of available resources in the system and/or the accessibility of the content offering at the edge server with reference to the central server complex. This random selection frequently results in the selection of an edge server that does not have the requested content offering stored locally. Accordingly, the selected edge server must request the content offering from the central server complex and wait for it to be delivered before it can begin streaming the content offering. This results in taxation of network resources and latency in delivering the content offering to a user.

Embodiments of the disclosure provide solutions to this problem by working to increase the cache efficiency of the video servers. Embodiments of the disclosure provide a new edge server selection mechanism that is likely to select an edge video server that has the requested video already stored in its cache. Embodiments of the disclosure provide thus provide an effective, cache-aware content delivery and serve selection/routing mechanism.

In one embodiment, a resource manager, which is operable with the back office, maintains content allocation register. In one embodiment, the content allocation register includes a popular asset list comprising a plurality of content assets stored at the central server, available for delivery through one or more edge servers, ranked by highest demand within a predetermined past usage window. Said differently, the resource manager maintains a list of content offerings requested by client devices, with each of those content offerings ranked by popularity for a configured period. The predetermined past usage window can be configurable, but in one embodiment has a default setting of twenty-four hours or less. Also, in one embodiment the number of content offerings included in the popular asset list is limited. For example, in one embodiment the maximum number of content offerings is one thousand content offerings. In another embodiment, the maximum number of content offerings is twenty-percent or less of the total number of content offerings available for delivery from the central server complex. Other quantity limits and predetermined past usage window durations will be obvious to those of ordinary skill in the art having the benefit of this disclosure.

In one embodiment, the resource manager receives requests for all content assets that are delivered to various client devices. Given this, in one embodiment the resource manager is operable to maintain the list of popular assets. In another embodiment, this functionality can be allocated to the back office. In yet another embodiment, the back office and resource manager can be combined together. When a video-on-demand request to play a content offering is honored by the resource manager and/or back office, the popular asset list shall be updated. As noted above, the popular asset list can be ranked by popularity during a predefined period in one or more embodiments. The popular asset list is updated in real time as content assets are delivered to client devices.

In one embodiment, the content allocation register also includes an edge server list indicating which edge servers have delivered each content offering in the popular asset list. Said differently, in one embodiment, the resource manager not only maintains the popular asset list, but also maintains a list of edge servers that have recently played content offerings found in the popular asset list. Timestamps indicating when each edge server delivered a content offering can also be included. In doing so, the content allocation register becomes a two-dimensional matrix, with a first dimension listing popular assets and a second dimension providing a list of edge servers that have recently delivered a particular asset to a client device. For each edge server in the list that has delivered a given content asset, a timestamp is provided that indicates when that asset was last played in one or more embodiments.

As a function of the content allocation register, the resource manager then routes requests more efficiently. As the resource manager keeps a list of popular assets, as well as a list of the edge servers that have recently streamed each asset, the delivery of new content requests can be based upon account available resources on an edge server as well as which edge servers have most recently played the requested asset in one or more embodiments. This preferential routing increases the likelihood that a selected edge server has the content offering already stored in its local cache. This process will become clearer with the description and figures below. Embodiments described below address the challenges of providing more efficient delivery of content in heterogeneous video-on-demand systems. Embodiments described below not only more efficiently deliver content, but are configured to operate with legacy on-demand system components as well.

Turning now to FIG. 1, illustrated therein is a content delivery system 100 configured with video-on-demand functionality. The content delivery system 100 of FIG. 1 stores content 110 on a local storage device 111 proximately located with an edge server 105. The stored content 112 is then delivered to the requestor of a video-on-demand session by way of a streaming server 107.

When new content is ready for delivery to the content delivery system 100, a content provider 101 delivers the content 110 to a content management system 102. The content management system 102 serves as a central server of the content delivery system 100. The content 110 can comprise any type of data, but for ease of illustration will be referred to as video content, as well as associated audio content, metadata, or other content, suitable for use in a video-on-demand session. By way of example, the content can be digitally compressed video content that can be demultiplexed and stored in a convenient format such as MPEG, MPEG 2, or MPEG 4. It will be clear to those of ordinary skill in the art having the benefit of this disclosure that other types of content could be used with the systems, methods, and devices described herein. The content provider 101 can provide the content 110 in various formats. For example, the system may receive radio-frequency signals by satellite 113 or data packets by land-based communication networks. In another embodiment, the system may receive adaptive bitrate packets by satellite 113 or terrestrial network.

The content management system 102, operating at a central server complex in one embodiment, then is operable to deliver the content 110 to components across the content delivery system 100 as needed and/or as directed. In some cases, this delivery is based upon demand requests from an edge server 105. Alternatively, as will be described in more detail below, this delivery can be at the direction of a resource manager 106 as a function of a content allocation register 120. For example, the content management system 102 can store the content 110 in a local repository 122. The content management system 102 is then operable with one or more edge servers 105 and edge storage devices 111. Accordingly, in response to requests from the edge server 105 and/or at the direction of the resource manager 106, the content management system 102 can arrange the storage of content 110 on the edge storage device 111 by replicating the content 110 stored in the local repository 122 in the edge storage device 111.

The edge server 105, in one embodiment, is a device capable of requesting and storing quantities of data, including but not limited to video content and other types of content. In one embodiment, the edge server 105 is operable with a streaming server 107 to deliver content 114 in the form of video and audio an interactive network 108 upon the request of a subscriber device 109, which may be a set-top box, computer, multi-media player, and other devices configured to specify desired content and/or to receive the video content for viewing.

A back office system 103 is operable with the content management system 102. The back office system 103, in one embodiment, contains pertinent information required for typical system operation. This information can include subscriber information and identifiers, subscriber device information and identifiers, metadata 115 corresponding to the content, and so forth. In some embodiments, the back office system 103 is configured to work with the resource manager 106 to provide resource management and resource allocation throughout the content delivery system 100. In one embodiment, the back office system 103 locally stores definitions for the content 110 and the metadata 115. When content is received and stored at the content management system 102, the back office system 103 can mark that the content is ready for usage by subscriber devices 109 in one or more embodiments.

Due to the fact that most content delivery from the content management system 102 to the edge servers 105 is in response to requests from subscriber devices 109, in many cases the back office system 103 will not have knowledge of what content is stored at the edge storage device 111 of the edge server 105. In one embodiment a resource manager 106, operable with the back office system 103, uses a content allocation register 120 to select a particular edge server 105 that is likely to have the requested content 114 stored within its edge storage device 111, thereby making content delivery across the system more efficient. This will be described in more detail below.

The metadata 115 associated with the content 110 generally comprises identification information corresponding to the content 110, without including the content itself. By way of example, metadata 115 can include content file size, content title, a summary of the content, and so forth. Where the content 110 is video content, such as a movie, the metadata 115 can include information such as the names of the actors, the rating, and type of content. Additional information can be added to the metadata 115, such as pricing, time of availability, packaging, and other identifying information.

The back office system 103, in one embodiment, is operable with a menu management system 104. The menu management system 104 is configured to generate a menu 116 or other on-demand navigational catalog for delivery to the subscriber device 109. The menu 116 provides the information necessary for the subscriber to determine what content is available, as well as other menu-based experiences provided by the subscriber device 109. The menu 116 can be generated in real time or in bulk format. Further, the menu 116 can be used in interactive systems or in more bulk-oriented menu presentation systems as well. Accordingly, in one or more embodiments the menu management system 104, working in tandem with the back office system 103, can mark that content 110 received by the content management system 102 is ready for usage by subscriber devices 109.

In one embodiment, the menu management system 104 works with the back office system 103 to define one or more lists of content titles that are available to the subscriber device 109. In one embodiment, the menu management system 104 can use metadata 115 to build the menu 116. For example, in one embodiment the menu management system 104 is configured to read the metadata 115 and add at least a portion of the metadata 115 to the menu 116 before the content is stored on the edge server. The back office system 103 can be configured to deliver the metadata 115 to the menu management system 104 so that all of the titles known to the back office system 103 can be included in the menu 116 regardless of where they are stored.

In one embodiment, a resource manager 106 is operable with the back office system 103 and the content management system 102. In one embodiment, the resource manager 106 is configured to allocate or otherwise manage system resources for the distribution of content 110 on the side of the content delivery system 100 that is proximately located with the subscriber device 109. For example, the back office system 103 can communicate with the resource manager 106 when video-on-demand sessions commence so that the resource manager 106 can allocate and control the necessary resources. The resource manager 106 can use information from the back office system 103 to determine resource allocations based upon a content allocation register 120 in one or more embodiments.

In one embodiment, when the content provider 101 delivers the content 110 to the content management system 100, the content management system 102 ingests the content 110. Once the content 110 has been processed and stored, the content management system 102 either creates or pulls metadata 115 for the content 110 and delivers it to the back office system 103. When the back office system 103 receives the metadata 115, in one embodiment it determines the title of the content 110 and marks the title as "available for viewing" by subscribers.

The back office system 103 then makes the metadata 115 available to the menu management system 104. As described above, the menu management system 104 uses the information contained in the metadata 115 to construct the menu 116. The menu 116 enables subscribers to view the list of available titles on the subscriber device 109.

In one embodiment, the back office system 103 is configured to communicate with the resource manager 106 as well to control resources and/or to determine resource allocation as a function of a content allocation register 120. In one embodiment, the resource manager maintains a content allocation register 120 that includes a popular asset list comprising a plurality of content assets stored at the local repository 122 of the content management system 102 and an edge server list.

In one embodiment, the plurality of content assets is ranked by highest demand. Accordingly, a content offering that has been requested by client devices ten thousand times will be ranked superior to another content offering that has only been requested ten times. Similarly, a content offering that has been requested fifty times will be ranked inferior to another content offering that has been requested fifty-two times.

In one embodiment, the content assets in the popular asset list will be limited to only those assets requested within a predetermined past usage window. For example, the resource manager 106 may be configured to only analyze requested content offerings for a predetermined past amount of time, such as four hours, eight hours, twelve hours, twenty-four hours, thirty-six hours, or forty-eight hours. Other predetermined past usage windows will be obvious to those of ordinary skill in the art having the benefit of this disclosure. In one embodiment, the default predetermined past usage window will be twenty-four hours.

In one embodiment, the content assets in the popular asset list will be limited to a predefined maximum number of assets. For example, in one embodiment the plurality of content assets in the popular asset list will comprise one thousand or fewer assets. In another embodiment, the plurality of content assets in the popular asset list will comprise less than twenty percent of a total number of content assets stored within the local repository 122 of the content management system 102. Other limits will be obvious to those of ordinary skill in the art having the benefit of this disclosure. Limiting the number of content assets in the popular asset list makes management of the list simpler as only the most popular subset of content offerings stored within the local repository 122 of the content management system 102 will be included in the list.

In one embodiment, the edge server list indicates which edge servers 105 have delivered each content asset in the popular asset list. The indication of which edge servers 105 have delivered each content asset can also be accompanied by a timestamp so that the resource manager 106 knows not only which edge server delivered a content offering, but when that content offering was delivered.

The combination of the popular asset list and the edge server list makes the content allocation register 120 a two-dimensional matrix in one or more embodiments. A first dimension is defined by the content offerings in the popular asset list, while a second dimension is defined by a list of edge servers 105 that have recently delivered the content offering to a subscriber device 109. Given that the resource manager 106 has a list of popular assets and the edge servers on which they have recently been delivered in the form of the content allocation register 120, the resource manager 106 can select an edge server that is likely to have requested content 114 stored thereon. Accordingly, the resource manager 106 can read the content allocation register 120 to direct the routing of subsequent deliveries of a popular asset as a function of the content allocation register 120. This allows the resource manager 106 to take into account available resources on a particular edge server, as well as to favor edge servers that have most recently played the requested content 114. By allowing the resource manager 106 to select a preferred edge server for routing, embodiments of the disclosure dramatically increase the likelihood that a selected edge server still has the requested content 114 stored locally in its cache, i.e., edge storage device 111.

When a subscriber initiates a video-on-demand session with the subscriber device 109, information indicating such is received at the resource manager 106. The resource manager 106 can then update the content allocation register 120 each time delivery of requested content 114 is fulfilled by delivering requested content 114 to a subscriber device 109 across a network 108 from a streaming server 107. In one embodiment, the resource manager 106 adds this information to the content allocation register 120 to make future edge server selections.

Figure 2:
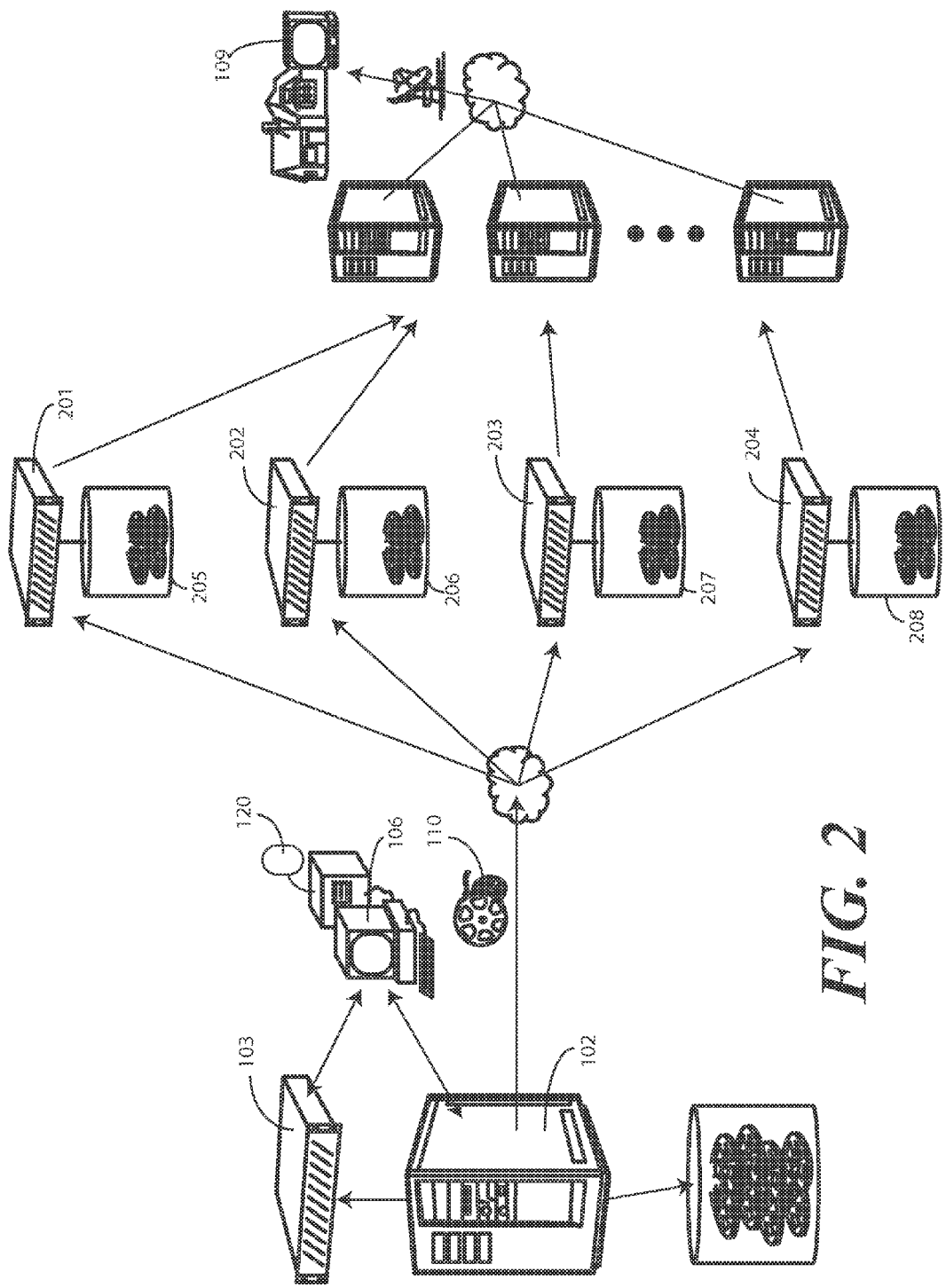
FIG. 2 another diagram of an explanatory video-on-demand system in accordance with one or more embodiments of the disclosure.

The process of selecting a particular edge server will now be shown in more detail with reference to FIGS. 2-5. As shown in FIG. 2, the content management system 102 can deliver content 110 to a subscriber device 109 through one or more edge servers 201,202,203,204. In one or more embodiments, the back office system 103 does not know whether the content 110 is stored within any one edge storage device 205,206,207,208 of the one or more edge servers 201,202,203,204. However, in response to receiving a request demanding content at the resource manager 106, the resource manager can read the content allocation register 120. One explanatory embodiment of the content allocation register 120 is shown in FIG. 3.

As shown in FIG. 3, in one embodiment the content allocation register 120 comprises a popular asset list 301 and an edge server list 302. The popular asset list 301 comprises a plurality of content assets 303,304,305,306,307,308,309,310,311,312 that are stored at a local repository (122) of a content management system (102). The illustrative content assets 303,304,305,306, 307, 308,309,310,311,312 of this embodiment include movies with the titles, "Mac and Buster go to Hurtsboro," "Door Block," "Brownie the Short," "Lake Adventures," "Kayla's Kitchen," "Cabin Sunset," "A Trip to Puillac," "Roll Down the Windows," "Brunch Anyone?," and "Tete du Cuvee."

In this illustrative embodiment, the plurality of content assets 303,304,305,306,307,308, 309,310,311,312 is limited to a predefined content asset limit 313. In one embodiment, the predefined content asset limit 313 is one thousand or fewer content assets. In another embodiment, the predefined content asset limit 313 is less than twenty percent of a total number of content assets stored at a local repository (122) of a content management system (102). Other predefined content asset limits 313 will be obvious to those of ordinary skill in the art having the benefit of this disclosure.

In this illustrative embodiment, the plurality of content assets 303,304,305,306,307,308, 309,310,311,312 is ranked 314 by highest demand. In one embodiment, the demand is based upon a number of views 315 during a predetermined past usage window 316, which is twenty-four hours in this embodiment. As noted above, the resource manager 106 can be selectively configured to analyze plurality of content assets 303,304,305,306,307,308,309,310,311,312 for any predefined past period of time in one or more embodiments.

Illustrating by example, "Mac and Buster go to Hurtsboro" has been viewed 10,000 times within a predetermined past usage window 316, while "Brownie the Short" has been viewed only 8,756 times. Accordingly, "Mac and Buster go to Hurtsboro" is ranked superior to "Brownie the Short" in the popular asset list 301, as it is more popular by way of being more in demand, i.e., it has more views 315, within the predetermined past usage window 316. "Brunch Anyone?," having only 2,754 views, is ranked inferior to both "Mac and Buster go to Hurtsboro" and "Brownie the Short" in the popular asset list 301 in that it is less popular by way of fewer views 315 during the predetermined past usage window 316.

In addition to the popular asset list 301, the content allocation register 120 also includes an edge server list 302. In this embodiment, the edge server list 302 indicates which edge servers delivered each content asset 303,304,305,306, 307,308,309,310,311,312 in the popular asset list 301. For example, "Mac and Buster go to Hurtsboro" was delivered by at least three edge servers having the Internet protocol addresses 192.168.10.57, 192.168.10.60, and 192.168.10.72, respectively.

In this illustrative embodiment, the edge server list 302 also includes a timestamp indicating when each edge server delivered each content asset 303,304,305,306,307,308,309, 310, 311,312 in the popular asset list 301. For example, edge server 192.168.10.57 delivered "Mac and Buster go to Hurtsboro" at least at 9:55 PM and 10:05 PM. Similarly, edge server 192.168.10.72 delivered this content asset 303 at least at 1:31 AM and 9:14 AM.

In response to receiving demand for a particular content asset, in one embodiment the resource manager 106 can read 317 the content allocation register 120 and select a selected edge server as a function of the content allocation register 120 in an attempt to select an edge server that already has a particular content asset 303,304,305,306,307,308,309,310, 311,312 stored within its local cache. This can be done in a variety of ways. For example, in one embodiment the resource manager 106 selecting an edge server as a function of the timestamp. Thus, for a client request to receive "Mac and Buster go to Hurtsboro" received by the resource manager 106 at 11:00 PM, the resource manager 106 may consult the content allocation register 120 and select edge server 192.168.10.57, since it delivered the content asset 303 more recently than the other edge servers. Thus, in one embodiment the resource manager 106 selects an edge server by selecting a server that has delivered the content asset 303 more recently before other edge servers that have delivered the content less recently.

Figure 4:
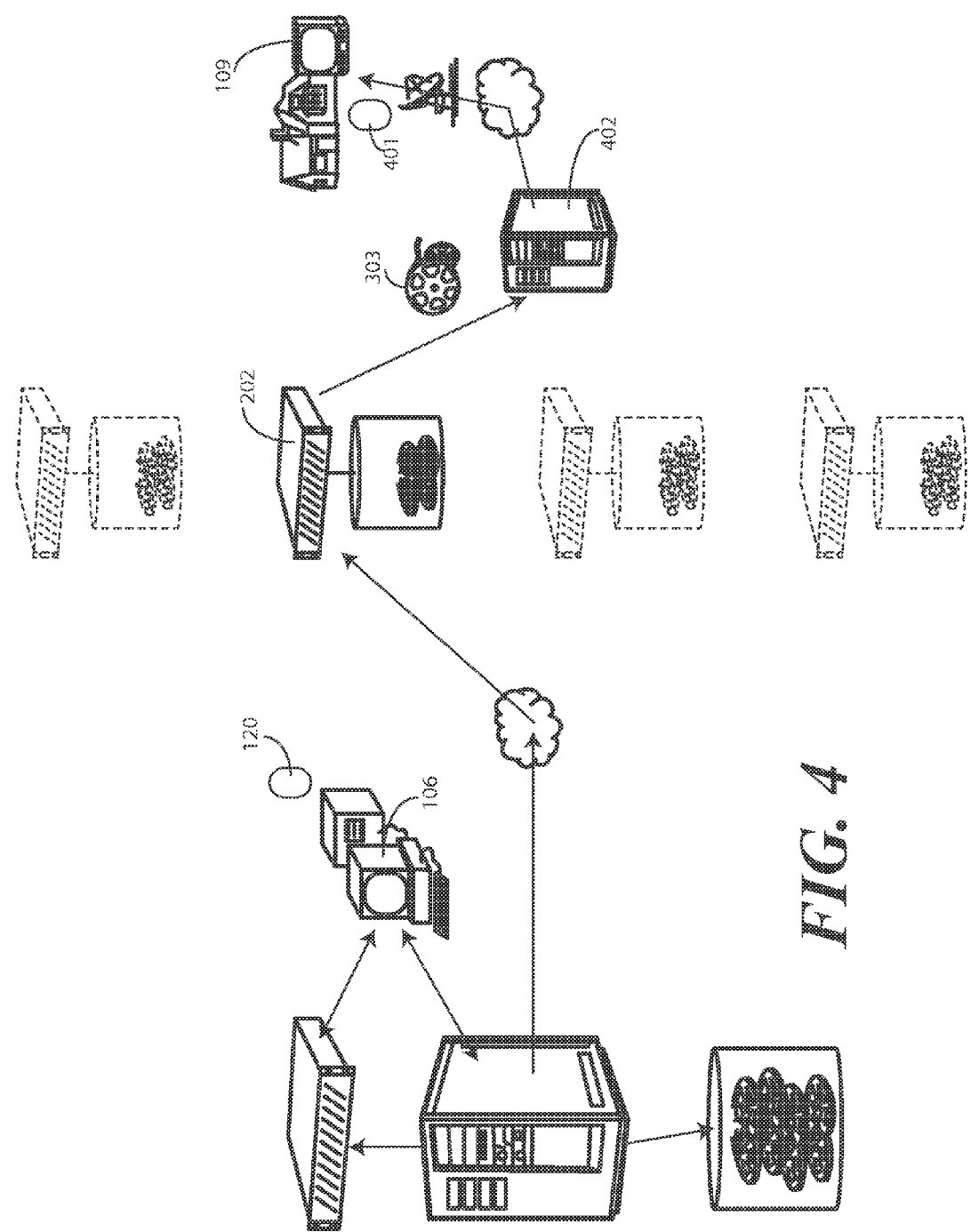
FIG. 4 illustrates another diagram of an explanatory video-on-demand system in accordance with one or more embodiments of the disclosure.

Turning to FIG. 4, it can be seen that edge server 202, which corresponds to Internet protocol address 192.168.10.57 has been selected to deliver the requested content asset. Accordingly, the resource manager 106 causes the selected edge server, i.e., edge server 202, to deliver the requested content asset 303 to a subscriber device 109 in response to a request for the content asset 303 in a video-on-demand session request 401. Fulfillment of the video-on-demand session request 401 occurs, in one embodiment, when the selected edge server 202 delivers the content asset 303 to a streaming server 402 for delivery to the subscriber device 109. When this occurs, the resource manager 106 can update the content allocation register 120 accordingly. In one embodiment, the resource manager 106 can update the popular asset list (301) to include the content asset 303 and the selected edge server 202 delivering the content asset 303.

Figure 5:
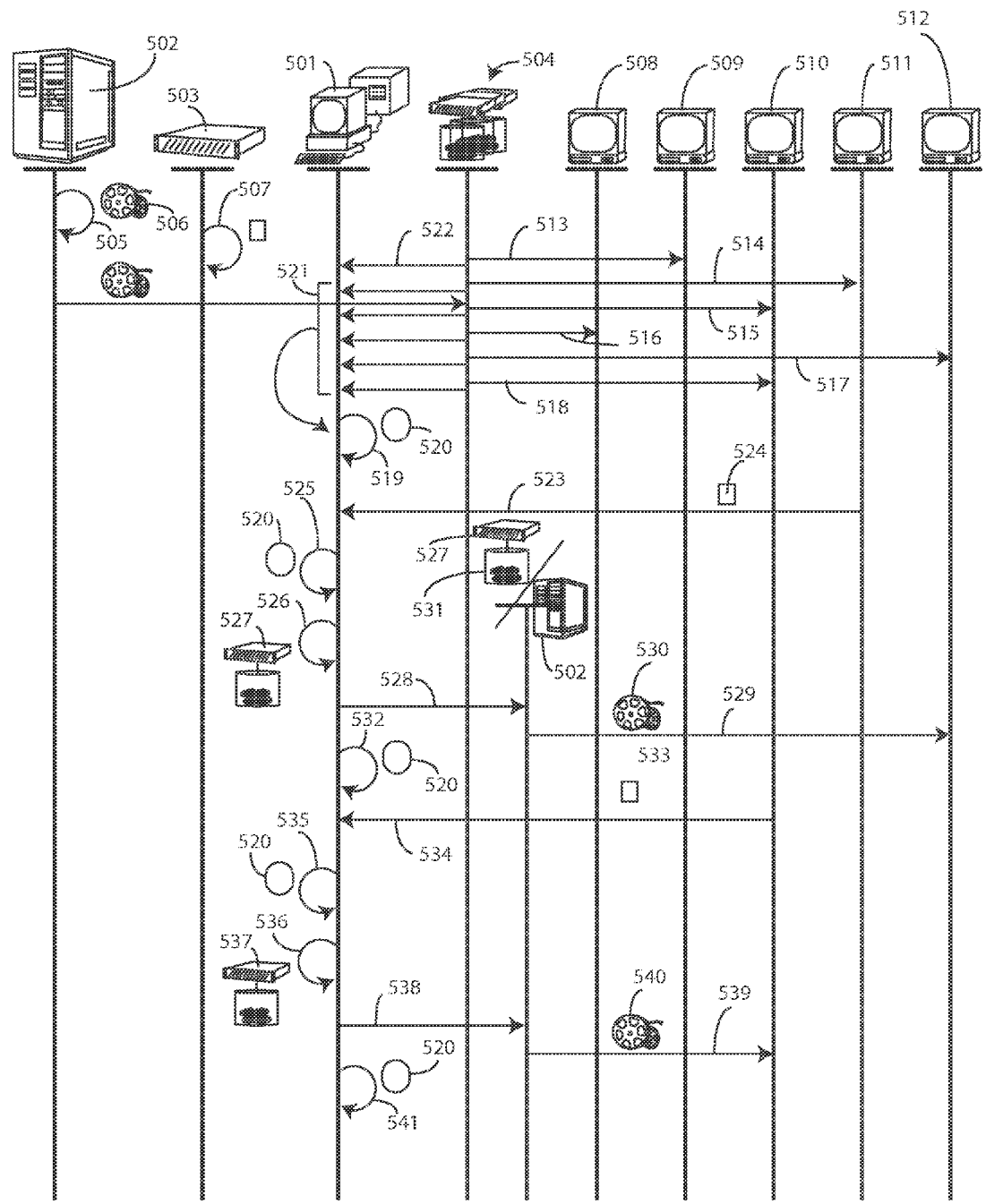
FIG. 5 illustrates an explanatory system and communication flow diagram in accordance with one or more embodiments of the disclosure.

A flow diagram of one explanatory embodiment of the disclosure is shown in FIG. 5. Turning now to FIG. 5, a resource manager 501 is in communication with a central storage server 502. The resource manager 501 is also in communication with a back office system 503 and a plurality of edge servers 504 disposed distally across a network from the central storage server 502. In one embodiment, the central storage server 502 stores 505 content 506. The back office system 503 then marks 507 that the content is ready for usage in response to the storing 505.

One or more client devices 508,509,510,511,512 then make demand requests for various content assets stored at the central storage server 502. As previously described, the plurality of edge servers 504 are to deliver 513,514,515,516,517, 518 requested content to the one or more client devices 508, 509,510,511,512 in response to the demand requests. When this occurs, the resource manager 501 builds 519 a content allocation register 520 by analyzing which content items are most popular during a predetermined past usage window 521 and recording this in a popular asset list. In one embodiment, the resource manager 501 also receives 522 information indicating which of the plurality of edge servers 504 delivered the content offering in the popular asset list to each client device 508,509,510,511,512 and records this in an edge server list. In one embodiment, the edge server list of the content allocation register 520 also includes a timestamp received by the resource manager 501. In one embodiment, the timestamp indicates when the edge servers 504 delivered the each content asset of the popular asset list.

At a later point in time, the resource manager 501 receives 523 a video-on-demand session request 524 requesting delivery of content. In one embodiment, the resource manager 501 reads 525 the content allocation register 520 and selects 526 a selected edge server 527 as a function of the popular asset list and the edge server list of the content allocation register 520. In one embodiment this comprises selecting a content asset from the popular asset list and then reviewing the timestamps and edge server identifiers of the edge server list. The resource manager 106 may then select a selected server having a more recent timestamp than at least some other edge servers of the plurality of edge servers 504.

Once the selected edge server 527 is chosen, the resource manager 501 can then cause 528 the selected edge server 527 to deliver 529 the requested content 530 in response to the video-on-demand session request 524. More times than not, the selected edge server 527 will have the requested content 530 locally stored within its edge server cache 531. However, if for some reason it is not stored there, the selected edge server 527 can obtain the requested content 530 from the central storage server 502. When the video-on-demand session request 524 is fulfilled, the resource manager 501 can update 532 the content allocation register 520 with information about the video-on-demand session request 524, including the Internet protocol address of the selected edge server 527, a corresponding timestamp, and so forth as previously described.

When another demand request 533 for another content asset is subsequently received 534, the resource manager 501 can again read 535 the content allocation register 520, select 536 another selected edge server 537, and cause 538 the selected edge server 537 to deliver 539 the requested content 540 in response to the demand request 533. Of course, the resource manager 501 can again update 541 the content allocation register 520 in response to fulfilling the demand request 533 as previously described.

Figure 6:
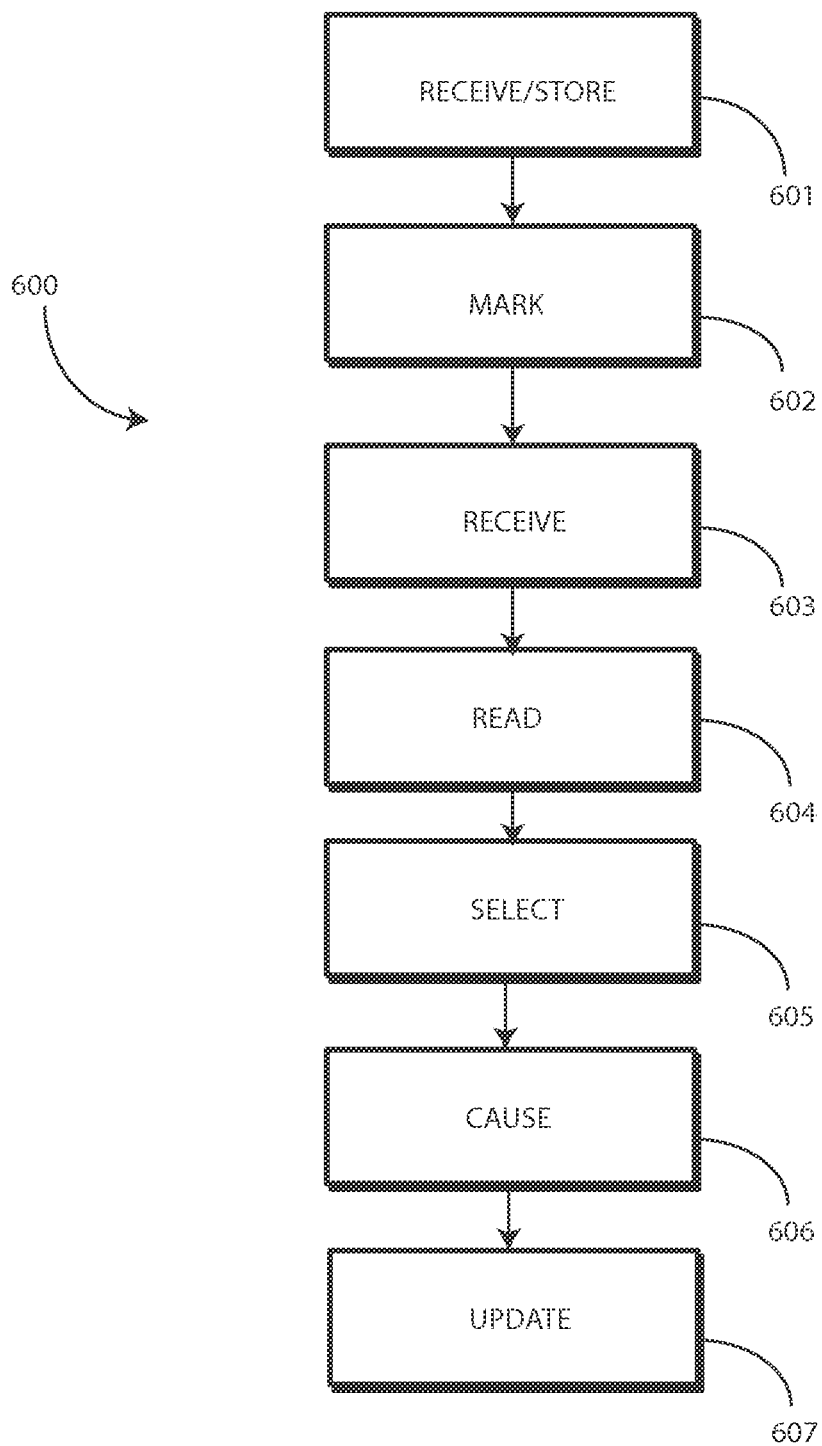
FIG. 6 illustrates an explanatory method, suitable for use in a video-on-demand system, the method in accordance with one or more embodiments of the disclosure.

Turning now to FIG. 6, illustrated therein is a method 600 of delivering resources of an edge server selected from a plurality of edge servers, disposed across a network and in communication with a central server, in accordance with one or more embodiments of the disclosure. At step 601, the method 600 includes storing content at the central server. At step 602, the method 600 includes marking, with a back office manager, a resource manager, a menu generator, or combinations thereof, that the content is ready for usage in response to the storing.

At step 603, the method 600 includes receiving a demand for the content. In one embodiment, the demand received at step 603 is received at a resource manager operable with the back office manger. In response to the receiving occurring at step 603, at step 604 the method includes reading, with the resource manager, a content allocation register.

In one embodiment, the content allocation register comprises a popular asset list and an edge server list. The popular asset list can comprise a plurality of content assets stored at the central server. In one embodiment, the plurality of content assets can be ranked by highest demand. In one embodiment, the plurality of content assets is limited to only those assets requested within a predetermined past usage window. One example of a predetermined past usage window comprises a period of twenty-four hours. Other predetermined past usage windows will be obvious to those of ordinary skill in the art having the benefit of this disclosure.

In one embodiment, the plurality of content assets included in the popular asset list is limited to a predefined content asset limit. For example, in one embodiment the predefined content asset limit comprises one thousand or fewer content assets. In another embodiment, the predefined content asset limit comprises a portion of a total number of content assets stored at the central server. In another embodiment, the predefined content asset limit comprises less than twenty percent of a total number of content assets stored at the central server. Other predefined content asset limits will be obvious to those of ordinary skill in the art having the benefit of this disclosure.

In one embodiment, the edge server list of the content allocation register indicates which edge servers have delivered each content asset in the popular asset list. In one embodiment, the edge server list also includes a timestamp indicating when the each edge servers delivered the each content asset in the popular asset list.

At step 605, the method 600 includes selecting a selected edge server as a function of the content allocation register. In one embodiment, the selecting of step 605 comprises the edge server as a function of the timestamp. In another embodiment, the selecting of step 605 comprises selecting edge servers having delivered the content more recently before other edge servers having delivered the content less recently. Other functions of the content allocation register by which selected edge servers may be chosen will be obvious to those of ordinary skill in the art having the benefit of this disclosure.

At step 606, the method 600 includes causing the selected edge server to deliver the content. In one embodiment, this comprises delivering the content from the selected edge server to a streaming server to fulfill a video-on-demand session request. At step 607, the method 600 includes updating the popular asset list to include the content and the selected edge server. In one embodiment, step 607 includes updating the popular asset list to include a time when the content was delivered from the selected edge server. The steps of the method can be repeated such that another demand for another content can be received, another edge server can be selected as a function of the popular asset list, thereby allowing the content allocation register to be again updated to include the another content and the another edge server.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of delivering resources of an edge server selected from a plurality of edge servers disposed across a network and in communication with a central server, comprising:
   storing content at the central server;
   marking, with a back office manager, that the content is ready for usage in response to the storing;
   receiving a demand for the content at a resource manager operable with the back office manager;
   in response to the receiving, reading, with the resource manager, a content allocation register, the content allocation register comprising:
     a popular asset list comprising a plurality of content assets stored at the central server, the plurality of content assets ranked by highest demand; and
     an edge server list indicating which edge servers have delivered each content asset in the popular asset list;
   selecting, with the resource manager, a selected edge server as a function of the content allocation register; and
   causing, with the resource manager, the selected edge server to deliver the content.

2. The method of claim 1, the plurality of content assets limited to only those assets requested within a predetermined past usage window.

3. The method of claim 2, the predetermined past usage window comprising a period of twenty-four hours.

4. The method of claim 2, the plurality of content assets comprising one thousand or fewer content assets.

5. The method of claim 2, the plurality of content assets comprising less than twenty percent of a total number of content assets stored at the central server.

6. The method of claim 2, further comprising delivering the content from the selected edge server to a streaming server to fulfill a video-on-demand session request.

7. The method of claim 1, further comprising updating the content allocation register to include the content and the selected edge server.

8. The method of claim 1, further comprising:
   receiving another demand for another content;
   selecting another edge server as the function of the popular asset list; and
   updating the content allocation register to include the another content and the another edge server.

9. The method of claim 1, the edge server list further comprising a timestamp indicating when each edge server delivered the each content asset in the popular asset list.

10. The method of claim 9, the selecting comprising selecting the edge server as a function of the timestamp.

11. The method of claim 10, the selecting comprising selecting edge servers having delivered the content more recently before other edge servers having delivered the content less recently.

12. The method of claim 9, further comprising updating the edge server list to include a time when the content was delivered from the selected edge server.

13. A video-on-demand system, comprising:
   a resource manager in communication with a central storage server, a back office system, and a plurality of edge servers disposed distally across a network from the central storage server, the resource manager to:
     receive a video-on-demand session request requesting delivery of content;
     read a content allocation register comprising:
       a popular asset list comprising a plurality of content assets stored at the central storage server ranked by highest demand within a predetermined past usage window; and
       an edge server list indicating which edge servers have delivered each content asset of the popular asset list;
     select a selected edge server from the content allocation register as a function of the popular asset list and the edge server list; and
     cause the selected edge server to deliver the content in response to the video-on-demand session request.

14. The video-on-demand system of claim 13, the edge server list further comprising a timestamp indicating when the edge servers delivered the each content asset of the popular asset list.

15. The video-on-demand system of claim 14, the selected edge server having a more recent timestamp than at least some other edge servers of the plurality of edge servers.

16. The video-on-demand system of claim 14, the plurality of content assets less than a predefined content asset limit.

17. The video-on-demand system of claim 16, the predefined content asset limit comprising a portion of a total number of content assets stored at the central storage server.

18. The video-on-demand system of claim 13, the resource manager further to update the content allocation register with each video-on-demand session request fulfilled within the predefined past usage window.

19. The video-on-demand system of claim 18, the selected edge server to fulfill the each video-on-demand session request by delivering the content a streaming server.

20. The video-on-demand system of claim 18, the predefined past usage window less than or equal to twenty-four hours.

* * * * *